United States Patent [19]

Belforte et al.

[11] Patent Number: 4,550,398
[45] Date of Patent: Oct. 29, 1985

[54] MODULAR SELF-ROUTING PCM SWITCHING NETWORK FOR DISTRIBUTED-CONTROL TELEPHONE EXCHANGE

[75] Inventors: Piero Belforte; Enzo Garetti; Luciano Pilati, all of Turin, Italy

[73] Assignee: Cselt - Centro Studi e Laboratori Telecomunicazioni S.p.A., Turin, Italy

[21] Appl. No.: 506,709

[22] Filed: Jun. 22, 1983

[30] Foreign Application Priority Data

Jun. 22, 1982 [IT] Italy .................. 67790 A/82

[51] Int. Cl.[4] .................. H04J 11/04; H04J 3/12
[52] U.S. Cl. .................. 370/66; 370/110.1
[58] Field of Search .................. 370/58, 63, 64, 110.1

[56] References Cited

U.S. PATENT DOCUMENTS

| | | | |
|---|---|---|---|
| 3,920,914 | 11/1975 | Regnier et al. | 370/63 |
| 3,983,330 | 9/1976 | Tongi | 370/63 |
| 3,991,276 | 11/1976 | Regnier et al. | 370/63 |
| 4,035,584 | 7/1977 | Lurtz | 370/63 |
| 4,142,068 | 2/1979 | Charransol et al. | 370/63 |
| 4,404,630 | 9/1983 | Belforte et al. | 375/10 |
| 4,473,900 | 9/1984 | Belforte et al. | 370/58 |

OTHER PUBLICATIONS

Proteo System: An Overview by Galimberti et al., International Switching Symposium, Sep. 21-25, 1981, Montreal, Canada.

LSI Components for Digital Line Stages by Melindo et al., presented International Switching Symposium, Sep. 21-25, 1981, Montreal, Canada.

"Corrective Maintenance in the Integrated PCM Telecommunications System IFS-1", by K. E. Wurhmann, presented at the International Switching Symposium, Oct. 25-29, 1976, Kyoto, Japan.

"A Subscriber Carrier Terminal Interface for an Integrated Digital Switching System", by Carl Easton, presented at the International Symposium on Subscriber Loops and Services, Sep. 15-19, 1980, Berlin.

Time-Division Distributed Switching System by Akiyama et al., presented at the International Switching Symposium, Sep. 21-25, 1981, Montreal, Canada.

Primary Examiner—Douglas W. Olms
Assistant Examiner—Frank M. Scutch, III
Attorney, Agent, or Firm—Karl F. Ross; Herbert Dubno

[57] ABSTRACT

An automatic exchange of a telephone system comprises a PCM switching network with a plurality of cascaded stages for establishing temporal and spatial connections between incoming channels on input lines of the first stage and outgoing channels on output lines of the last stage in response to commands from external controllers dialoguing with internal controllers of the network. Pairs of switching matrices forming part of nonadjacent stages are combined into modular switching units each provided with its own internal controller. Routing instructions are transmitted from an external controller to a first internal controller which selects a signal path through the matrices of its own switching unit and informs a second internal controller of that selection whereupon the latter extends the path through an adjoining switching unit, and so on until the connection is completed. With digital message words such as speech bytes traveling in a forward direction from the input side to the output side of the network, the instruction words pertaining thereto move in the opposite direction over the same interstage links; the two paths are mutually conjugate within each switching unit, their matrices being bypassed by the routing instructions.

12 Claims, 8 Drawing Figures

MODULAR SELF-ROUTING PCM SWITCHING NETWORK FOR DISTRIBUTED-CONTROL TELEPHONE EXCHANGE

FIELD OF THE INVENTION

Our present invention relates to a modular structure for a pulse-code-modulation (PCM) switching network of the multistage type forming part of an automatic exchange of a telecommunication (especially telephone) system.

BACKGROUND OF THE INVENTION

A network of this type is the subject matter of commonly owned U.S. patent application Ser. No. 339,101, now U.S. Pat. No. 4,473,900, filed Jan. 13, 1982 by three of us (Piero Belforte, Mario Bondonno and Luciano Pilati) jointly with two others. As particularly described in that application, whose disclosure is incorporated by reference into our present application, the network comprises a set of integrated outer modular units, a set of integrated inner modular units and a set of integrated central modular units, the outer and inner modular units being referred to as "folded" since each of them incorporates two switching matrices pertaining to nonadjacent stages of the network. Thus, each outer modular unit includes a first-stage switching matrix with inputs connected to incoming PCM lines and a last-stage switching matrix with outputs connected to outgoing PCM lines; each inner modular unit includes a second-stage switching matrix with inputs connected to outputs of several first-stage matrices and a penultimate-stage switching matrix with outputs connected to inputs of several last-stage matrices. Each "unfolded" central modular unit includes at least one middle-stage switching matrix whose inputs are linked to outputs of several second-stage matrices and whose outputs are linked to inputs of several penultimate-stage matrices; with a network having an odd number of stages greater than five, at least one other set of "folded" modular units could be used to accommodate additional switching matrices inserted in the input and output connections of the middle-stage matrix. Each modular unit further includes ancillary circuitry connected to its input and output ends for checking the performance of the associated switching matrix or matrices. The operation of the switching matrices is controlled by a multiplicity of base-level microprocessors, one for each modular unit, each of which is responsive to routing instructions from a higher-level controller and is connected not only to the associated switching matrix or matrices but also to the ancillary circuitry of the unit for the detection of operational errors.

As further described in that pending application, the ancillary circuitry of each modular unit comprises an upstream sampler and a downstream sampler for each switching matrix thereof, each upstream sampler having inputs directly connected to those of the associated matrix while each downstream sampler has inputs at least indirectly connected to the outputs of its matrix. The two samplers thus connected across a matrix extract respective bit combinations which are fed, with the necessary relative delay compensating for transit time, to comparison means within the associated microprocessor for the detection of possible disparities therebetween.

In order to facilitate detection of transmission errors not only in the switching matrices themselves but also in their interstage connections, the ancillary circuitry of at least the modular units following those of the first network stage is described as further comprising transceivers connected to the inputs of switching matrices of subsequent stages for feeding back bit combinations, identical with those extracted by the associated upstream samplers, to downstream samplers of preceding stages. More particularly, an output transceiver immediately downstream of each preceding switching matrix and an input transceiver immediately upstream of each subsequent switching matrix are integrated with their associated matrices in the respective modular units. In a modified structure each modular unit includes one or two input/output transceivers interconnected by two-way links to establish signal paths through all the stages of the network, each unit additionally having one or two feedback transceivers interconnected by bidirectional links to establish testing connections independent of the aforementioned signal paths.

The network of this pending application, however, is designed for centralized control by the exchange equipment and not for a distributed-control telephone exchange toward which current technology is evolving. A modular network structure suitable for interfacing with control means distributed on the network periphery is described in U.S. Pat. No. 4,201,890 in the names of Alan J. Lawrence et al. The latter network comprises several stages consisting of multiport switching elements whose 16 ports are integrated components each designed to handle 32 16-bit channels of a single nonstandard bidirectional PCM group. Each switching element is capable of identifying a free output channel through wired logic circuitry at each port. All other routing orders are provided stage by stage by the peripheral control means, using the same channel on which the conversation is to be routed.

The flexibility of utilization of a switching element in this system is limited by the presence of wired-logic routing circuits. Moreover, the routing procedures require the use of 16-bit messages which makes the system incompatible with the standard PCM technology and thus necessitates the use of special components which cannot be used in other parts of the telephone exchange or in combination with standard PCM channels; this requires the provision of interface circuits for signal-format conversion. Incompatibility with standard PCM systems is accentuated by the fact that the same channel subsequently used for speech is first utilized for signaling, making it necessary to complement transmitted messages with information indicating whether it pertains to speech or signaling. As routing control is left largely to the telephone exchange itself, the equipment of that exchange is burdened with the task of commanding the establishment of a connection by each individual switching element stage by stage. Finally, network diagnosis is not decentralized down to the level of the individual switching element and thus devolves entirely upon the supervisory units located at the network periphery.

Another example of a network for distributed-control telephone exchanges is described in a paper titled "Time-division distributed switching system" by Minoru Akiyama et al, presented at the International Switching Symposium of 21-25 Sept. 1981 in Montreal, Canada. This network consists of temporal switching stages controlled by microprocessors and of spatial switching stages with interstage connections implemented by 10-bit parallel PCM groups; it is capable of routing PCM channels autonomously with a step-by-step procedure on the basis of commands from control units distributed on its periphery. Routing orders again use the same channel that is subsequently utilized for speech; thus, the two additional bits serve to indicate whether the message pertains to signaling or speech. This type of structure requires two different kinds of switching elements for time and space switching; any expansion demands that interstage links be rearranged through a different configuration of spatial stages. The temporal switching element does not operate on standard serial PCM groups; here, too, interface circuits must convert such standard PCM groups—arriving from subscribers and from trunks—to the format required within the switching network. The use of 10-bit parallel PCM groups makes the connections between network switching elements cumbersome; switching capacity in terms of PCM channels handled by the basic module is limited. Also, as in the system of Lawrence et al, circuit diagnosis is not decentralized down to the individual basic-module level and thus devolves entirely upon the peripheral supervisory units.

OBJECTS OF THE INVENTION

The general object of our present invention is to provide an improved switching network of the type described in commonly owned application Ser. No. 339,101 which allows for the distributed control of its constituent matrices to establish and disestablish respective segments of a signal path between a selected input line and a selected output line of the network adapted to carry data words pertaining to groups of incoming and outgoing PCM channels, all with a high degree of flexibility and avoidance of the inconvenience referred to above.

A more particular object is to provide a network of this description which can be controlled by commercially available microprocessors and whose constituents can be realized by large-scaleintegration (LSI) technology.

SUMMARY OF THE INVENTION

A PCM switching network according to our invention is divided into an odd number of stages each including a plurality of switching matrices which are individually connectable in cascade with matrices of one or two adjoining stages to set up forward-signaling paths for the transmission of digital speech or other message words from given input lines to select output lines of the network. As known per se from the pending Belforte et al application identified above, the network is "folded" in that matrices of nonadjoining stages on opposite sides of a middle stage are structurally united into matrix pairs each provided with a common controller. These common controllers, along with central controllers associated with matrices of the middle stage, form part of internal control means responsive to command from external control means of the exchange for establishing and disestablishing temporal and spatial connections between incoming and outgoing PCM channels by way of the aforementioned forward-signaling paths each involving one matrix of every stage. Ancillary circuitry, also forming part of the internal control means, bypasses the cascaded matrices for the transmission of routing instructions between the external control means, the common controllers and the central controllers in a direction opposite that of a message-word transmission, the routing instructions passing over interstage links also forming part of the forward-signaling paths.

Pursuant to a more particular feature of our invention, the interstage links include transceivers that are disposed upstream and downstream of each matrix. In the preferred embodiment described hereinafter, the paths used for forward and reverse signaling are mutually conjugate; this means that, for any forward-signaling path set up by a common controller through one matrix of the associated pair, the routing instructions intended for and emitted by that controller pass through transceivers respectively disposed downstream and upstream of the other matrix of that pair.

A network pursuant to our invention may also be provided, in a manner known per se from the above-identified Belforte et al application, with a pair of samplers connected to signal lines at locations upstream and downstream of each matrix for extracting message words entering and leaving the respective matrix in an established signal path at instants separated by the transit time between these locations so that, if the signal path is continuous between the locations referred to, the extracted data words will be identical as determined by a comparator in the associated internal controller. This controller, accordingly, will be able to verify such continuity; if a mismatch between the extracted words is found to exist, the controller may—according to another feature of our invention—activate interface means of the ancillary circuitry to check on the presence of a continuity-indicating test code emitted by a downstream transceiver.

BRIEF DESCRIPTION OF THE DRAWING

The above and other features of our invention will now be described in detail with reference to the accompanying drawing in which.

SPECIFIC DESCRIPTION

Figure 1:
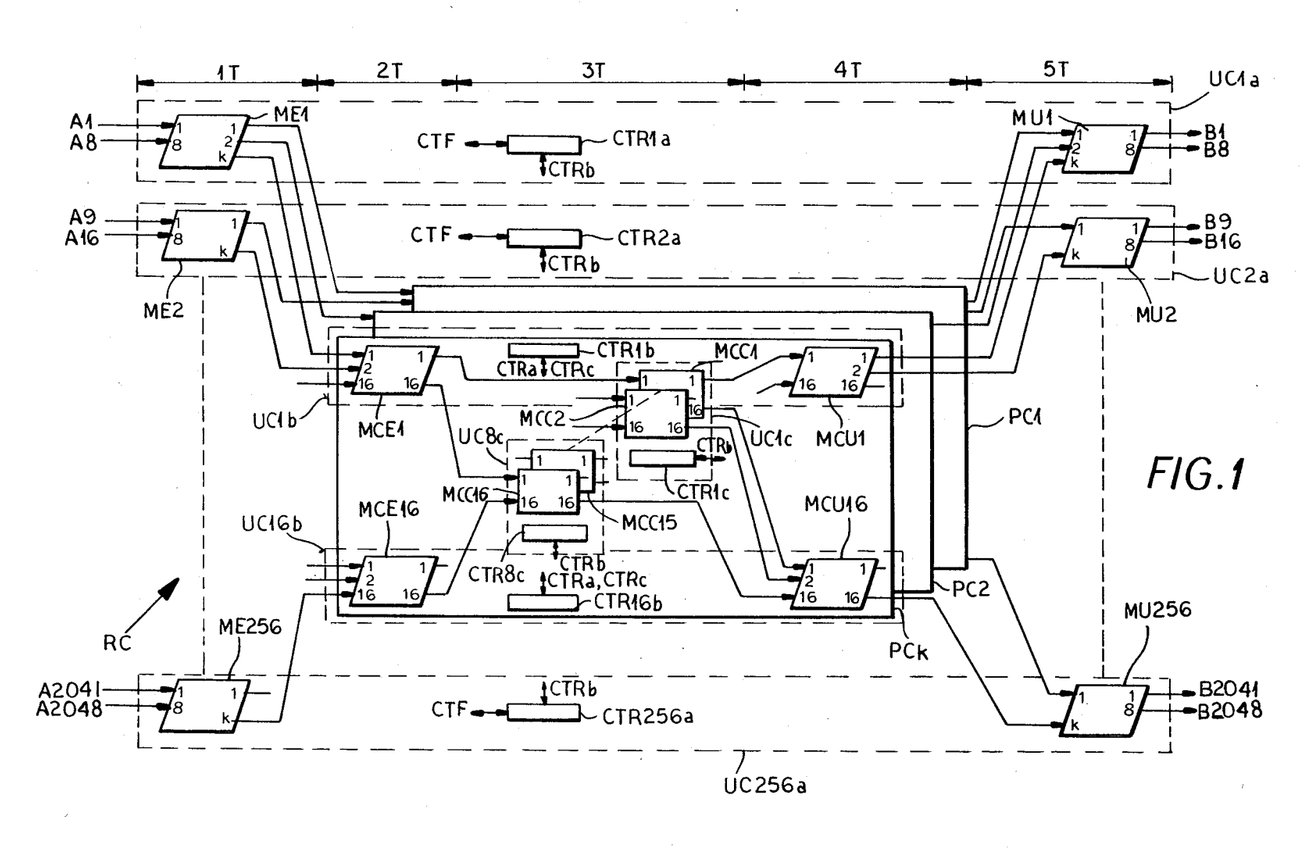
FIG. 1 is an overall block diagram of a PCM switching network embodying the invention.

In FIG. 1 we have shown a switching network RC according to our invention with five time-division (TDM) stages 1T, 2T, 3T, 4T, 5T pertaining to a transit exchange with 2048 incoming PCM links A1 ... A8, A9 ... A16, ... A2041 ... A2048, and 2048 outgoing PCM links B1 ... B8, B9 ... B16 ... B2041 ... B2048, each designed to carry a standard PCM group with 32 8-bit channels.

The layout of FIG. 1 is virtually identical with that shown in FIG. 1 of the commonly owned Belforte et al application Ser. No. 339,101, except for the controllers associated with the network.

The first stage 1T consists of 256 rectangular PCM switching matrices ME1 ... ME256, each having 8 inputs connected to as many incoming lines and k outputs ($8 \leq k \leq 16$) extending toward the second stage 2T.

The three intermediate stages 2T-4T are organized in k switching planes PC1, PC2 . . . PCk each including 16 square matrices capable of handling 16 incoming/outgoing groups. FIG. 1 shows only plane PCk in detail; the matrices of stage 2T are designated MCE1 . . . MCE16, those of stage 3T are labeled MCC1 . . . MCC16, and those of stage 4T bear references MCU1 . . . MCU16. In these and other designations, letters "E" and "U" stand for "input" (Italian: "Entrata") and "output" (Italian: "Uscita"), respectively, whereas "C" denotes "central".

The fifth stage 5T consists of 256 rectangular matrices MU1 . . . MU256, identical with matrices ME1 . . . ME256 but capable of handling k input groups and 8 output groups. The first-, second-, third-, fourth- and fifth-stage matrices will be collectively referred to as ME, MCE, MCC, MCU and MU, respectively.

These matrices all start from a single switching element with 8 input groups and 8 output groups as described in commonly owned U.S. Pat. No. 4,386,425 also in the names of Belforte et al. Connections between individual elements, combining them into 8×k and 16×16 matrices, are shown in FIGS. 3 through 5 of that patent.

The first-stage matrices ME and the second-stage matrices MCE are so interconnected that all No. 1 lines originating at the 256 matrices ME are connected in sequence to the 256 inputs of central plane PC1, all No. 2 lines are connected to the 256 inputs of central plane PC2, and so on up to the No. k lines which are connected to the inputs of plane PCk. The connections between the outputs of planes PC1 . . . PCk and the inputs of matrices MU1 . . . MU256 are a mirror image of the connections between matrices ME and the inputs of planes PC1 . . . PCk.

Matrices MCE, MCC and MCU are interconnected within each plane. More particularly, the No. 1 output lines of the 16 matrices MCE1 . . . MCE16 are connected in sequence to the 16 inputs of matrix MCC1, the No. 2 output lines of the same matrices MCE1 . . . MCE16 are connected in sequence to the 16 inputs of matrix MCC2, and so on up to the No. 16 output lines which are connected to the 16 inputs of matrix MCC16. The connections between matrices MCC and MCU are a mirror image of those between matrices MCE and MCC.

As further shown in FIG. 1, the position of central stage 3T consisting of matrices MCC is symmetrical relatively to the rest of the network.

Areas UC1a . . . UC256a, UC1b . . . UC16b, UC1c . . . UC8c enclosed by dashed lines indicate groupings of basic matrices associated with respective internal or network controllers CTR1a . . . CTR256a, CTR1b . . . CTR16b and CTR1c . . . CTR8c. These groupings correspond to effective structural modules of the network, referred to hereinafter as switching units. The modules are realized by a single type of printed-circuit board and use components of identical character though they may differ from one another by the positioning of their constituents and may also have controllers with different software.

In particular, modular units UCla . . . UC256a each include a first-stage matrix ME and a fifth-stage matrix MU; units UC1b . . . UC16b each include a second-stage matrix MCE and a fourth-stage matrix MCU whereas units UC1c . . . UC8c each contain two matrices MCC. For the sake of brevity, we shall collectively refer to units UC1a-UC256a, UC1b-UC16b and UC1c-UC8c as UCa, UCb and UCc, respectively.

With this arrangement, the network of FIG. 1 may be given a folded structure. Thus, the same modular unit will have available both an incoming and a corresponding outgoing line multiple, serving respective PCM groups, which are both subject to governing and diagnostic functions by the same controller CTR.

Moreover, the constructive folding of modular switching units UCa and UCb makes it possible to distribute the switching capacity of units UCa over two blocks of 256 channels used respectively in the first and the fifth stage, and to distribute the capacity of units UCb over two blocks of 512 channels used in the second and the fourth stage. This has the advantage of enabling a modular growth in overall network capacity in steps of 256 PCM channels on the periphery, rather than of 512 channels as would be the case with the use of an individual switching unit in unfolded form, i.e. a unit incorporating two matrices of the same stage. Thus, in the event of failure of any one such modular unit, the number of links remaining out of service can be limited to 256.

Such modular growth is achievable by progressively increasing the number of outer modular units UCa and by increasing the number of folded inner units UCb within each switching plane PC. Consequently, each increase by 16 outer units UCa corresponds to an increase by one inner unit UCb in each of the k switching planes PC.

The type of interstage connection described makes the network completely accessible.

The possibility of varying the number of central planes up to a maximum of 16 enables minimization of blocking probability in the network.

From the point of view of reliability, and aside from the above-mentioned modularity of peripheral degradation, the central stages 2T-4T respond to failure with a very limited impairment of traffic since any failure affects a maximum of 1024 interstage channels.

A generic controller CTR, designed as a microprocessor, has the task of dialoguing with the controllers of adjacent switching units, executing routing orders (connection, disconnection, blocking), verifying established connections, diagnosing itself, generating and handling alarm messages, and determining an existing identification of network configuration (recognition of inter-unit connections).

The controllers of the various switching units are interconnected in a manner analogous to that of the matrices. In particular, for dialoguing with other controllers of the network or with the control units of the exchange (cf. FIG. 2) for purposes of network management, a controller has available a number of physically separate bidirectional communication channels—referred to hereinafter as "virtual"—which is equal to the number of PCM groups that the corresponding modular switching unit UC can accommodate for the conveyance of information—specifically speech—signals. The term "virtual" is meant to signify that these particular channels, serving for the exchange of routing instructions, pass over signal paths which are not independently selected but are correlated with paths chosen for the transmission of speech signals to which these instructions pertain. Data words pass in mutually opposite directions, via conjugate signal links, over these correlated paths between matrices of adjacent stages;

within each stage the virtual channels bypass the matrices traversed by the speech channels.

This arrangement obviates the need for bits serving to distinguish between signaling and speech messages; thus, the network according to our invention can handle standard PCM channels. The allocation of a dialogue channel to each PCM group meets those reliability requirements that call for a distribution of the signaling paths.

Double-headed arrows CTRa, CTRb, CTRc, CTF show connections of the controllers to one another and to the control equipment of the exchange. These connections also appear in FIG. 2 which shows the network RC of FIG. 1 in symbolic and folded form, as well as its insertion in a distributed-control telephone exchange; peripheral units UL1 . . . ULh . . . UL2048 of this exchange are connected to trunks or to subscribers. These peripheral units are allocated singly (UL1) or in groups to control units CTFa, CTFb; in the more general case the network is also connected to other control units CTFc which can perform functions of a higher hierarchical level than those of units CTFa and CTFb, or functions relating to dialogue between these units as well as possible auxiliary functions. Units CTFa, CTFb and CTFc together constitute the external control means of the telephone exchange. These units communicate with one another through speech channels derived from PCM connections extending toward the network (single-line arrows) and with the network controllers through the dedicated PCM channel of each group passing to the network (double-line arrows). Also within network RC, single-line arrows indicate speech connections and double-line arrows indicate channels for dialogue between controllers.

Figure 2:
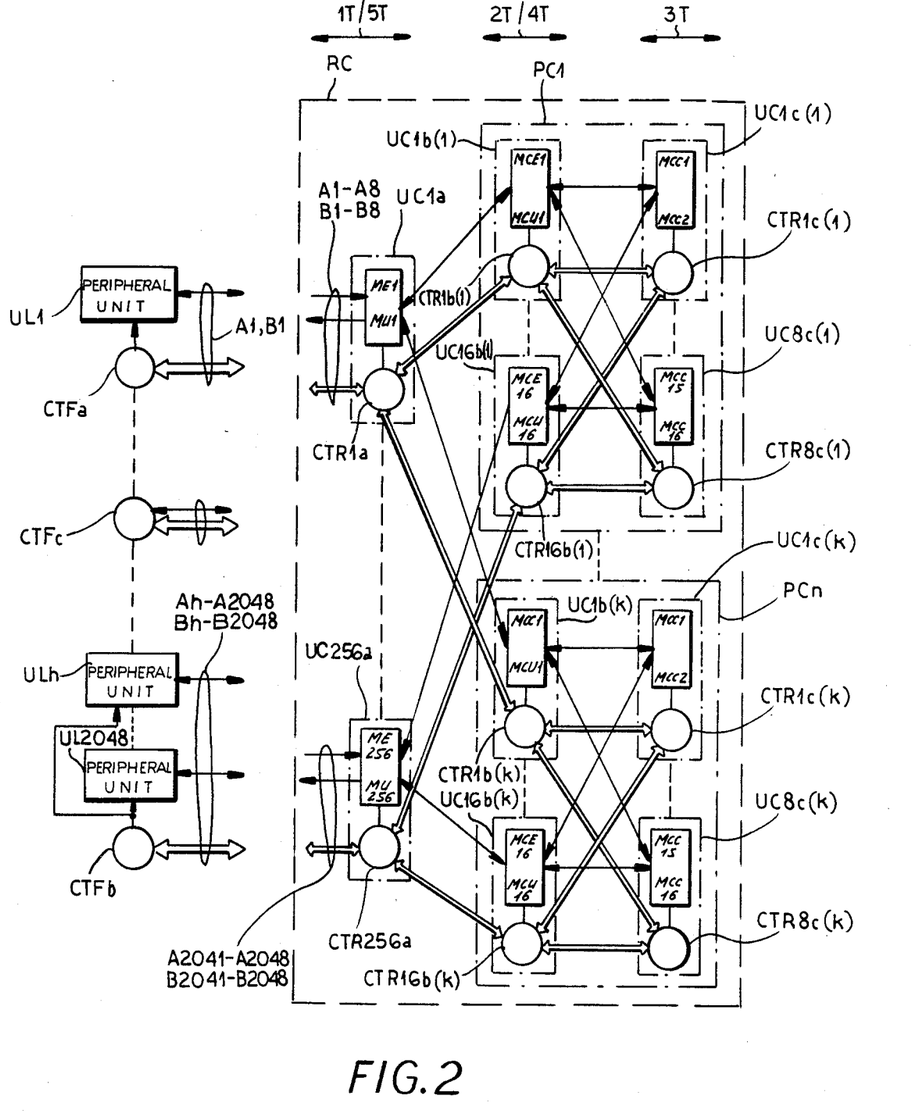
FIG. 2 illustrates the PCM switching network of FIG. 1, in folded form, and its connections with peripheral control units of an associated telephone exchange.

In FIG. 2 the elements described with reference to FIG. 1 have been indicated with the same symbols; parenthetical postscripts identifying their planes have been added for units UCb, UCc and their respective controllers. Connections between matrices are shown separately from those between controllers, even though in reality they are part of the same links, since they are conceptually distinct from one another.

Figure 3:
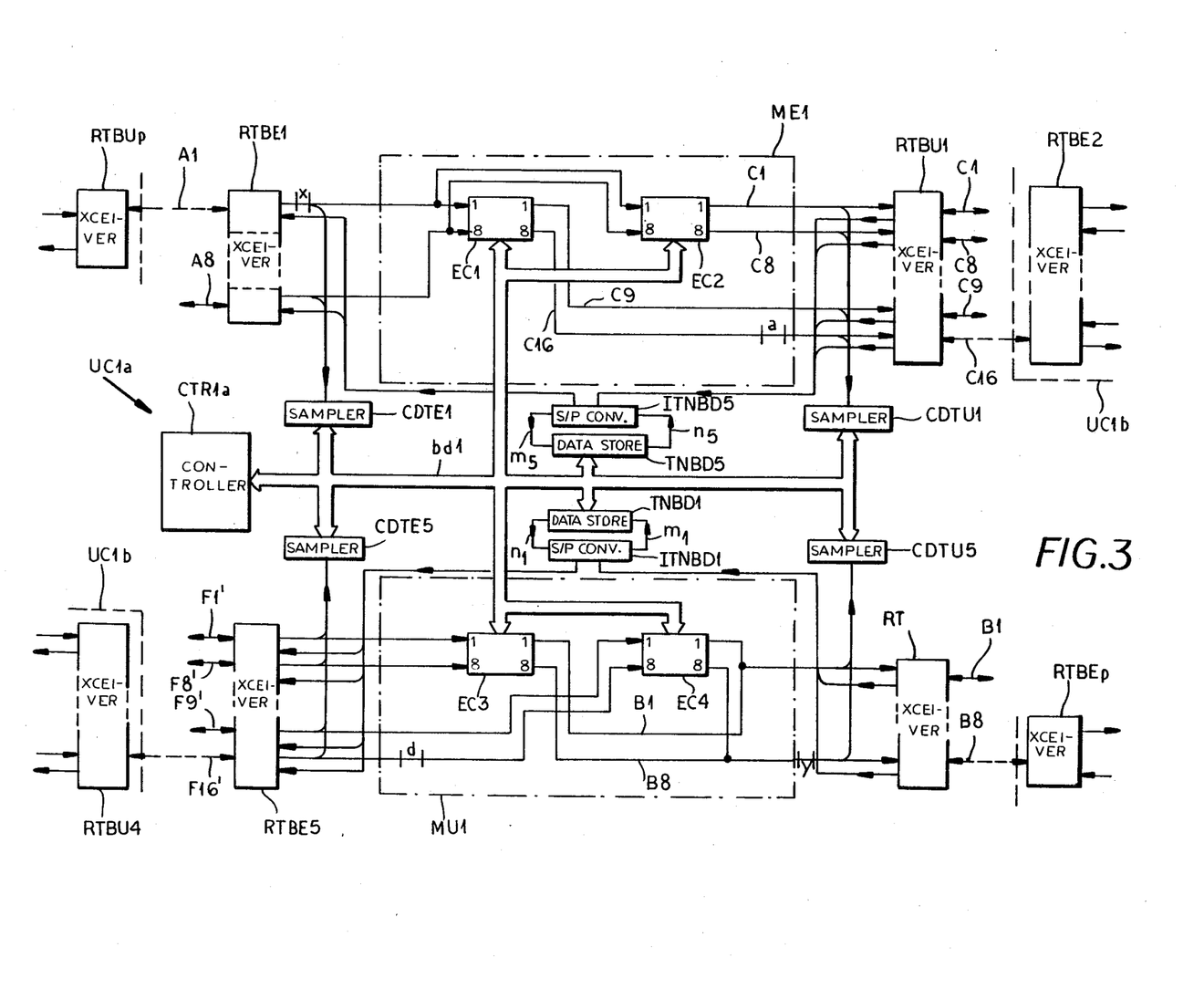
FIGS. 3, 4 and 5 are more detailed block diagrams of various switching units used in the network of FIG. 1.

FIG. 3 shows switching unit UC1a in detail. By way of example it is here supposed that matrices ME1 and MU1 respectively perform an expansion from 8 incoming lines to 16 and a concentration from 16 outgoing lines to 8. To this end, the matrices each consist of two switching elements or arrays EC1, EC2 and EC3, EC4, respectively, the first two of which have inputs connected in parallel to lines carrying groups A1 . . . A8 while the other two have outputs connected in parallel to lines carrying groups B1 . . . B8. The four switching elements EC1 . . . EC4 are connected to controller CTR1a through a bidirectional data bus bd1. At C1 . . . C16 we have indicated the 16 PCM groups emitted by matrix ME1 toward the second stage, and at F1' . . . F16' we have indicated the PCM groups reaching matrix MU1 from the fourth stage.

In addition to the switching matrices and the controller, the switching unit also includes ancillary diagnostic circuits or analyzers CDTE1, CDTU1 . . . CDTE5, CDTU5 and RTBE1, RTBU1 . . . RTBE5, RTBU5, and coupling circuits TNBD1, ITNBD1 . . . TNBD5, ITNBD5 for dialoguing with the controllers of units UCb (FIG. 1) and with the distributed external controllers CTFa, CTFb, CTFc (FIG. 2). Postscripts 1 and 5 indicate circuits belonging to the first and fifth network stages, respectively. These components are all integrated circuits, enabling any generic unit UC to be accommodated on a single printed-circuit board. Circuits CDT are samplers having the task of extracting a bit octet or byte relating to a channel of one of the incoming or outgoing PCM groups entering or leaving the matrices ME1, MU1; the extraction occurs at an instant established by the controller. Circuits CDT then store the byte and supply it to the controller through data bus bd1.

The structure of data extractors CDT conforms to that of commonly owned U.S. patent application Ser. No. 235,947 filed Feb. 19, 1981 by Piero Belforte and Renzo Bortignon, now U.S. Pat. No. 4,404,630.

Circuits RTBE and RTBU are full-duplex transceivers whose structure is described in commonly owned U.S. Pat. No. 4,393,494 in the names of Piero Belforte and Renzo Bortignon. With transceivers RTBE and RTBU respectively referred to as "upstream" and "downstream", when viewed in a forward direction in which speech bytes travel from the input side to the output side of network RC, the bytes of routing instructions pass through the downstream transceiver RTBU and then through the upstream transceiver RTBE associated with a matrix of that stage. The signal paths thus made available for the exchange of routing instructions between the controllers of adjacent stages should have a bandwidth at least equal to that needed for the speech bytes.

Figure 4:
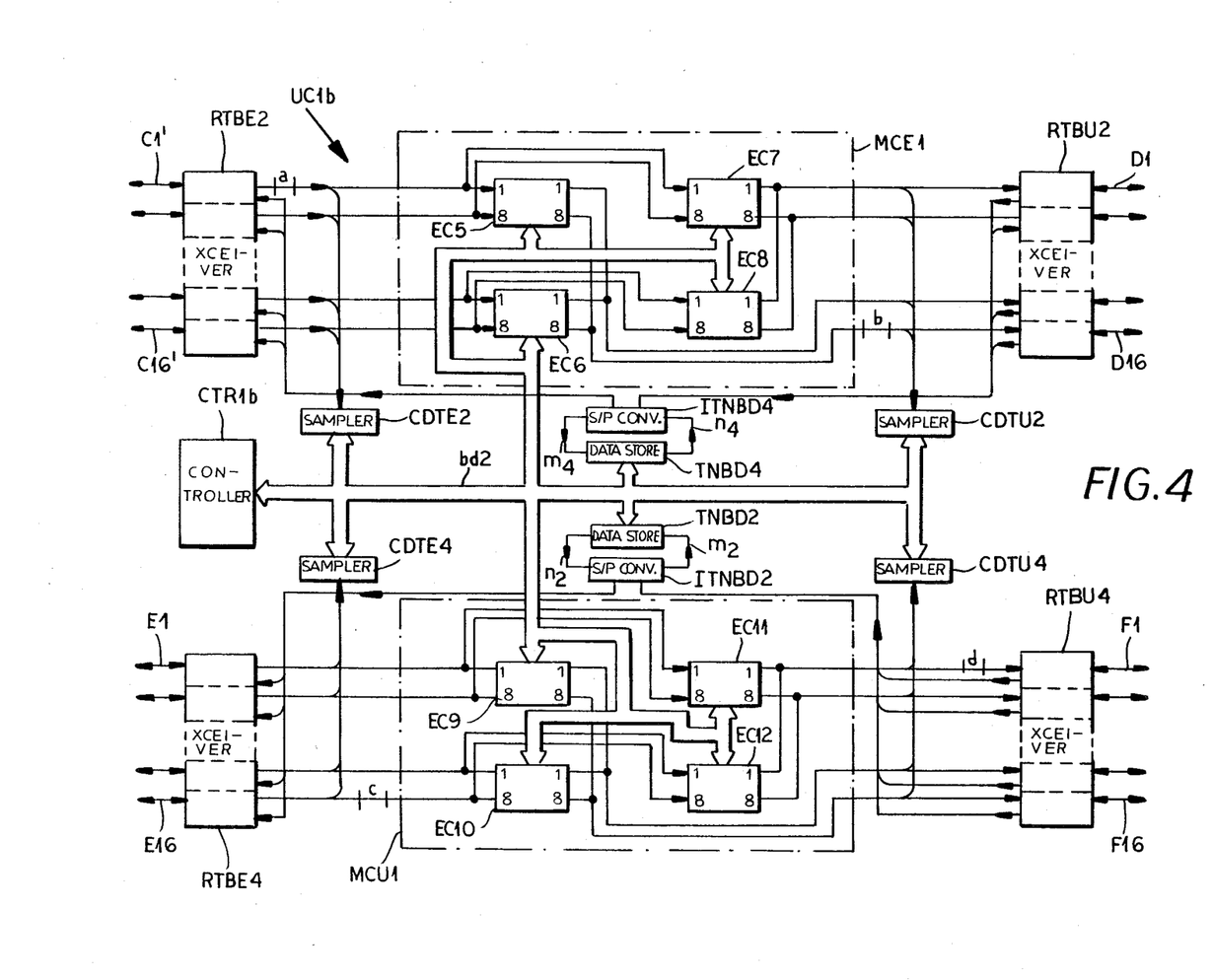

In modular unit UC1a (FIG. 3), for example, controller CTR1a receives an initial routing instruction from an external controller of the exchange by way of peripheral transceiver RTBEp, downstream transceiver RTBU5, converter ITNBD1 and interface or data store TNBD1 as well as bus bd1. On the basis of this instruction, the controller selects a forward path for speech transmission which includes transceivers RTBUp and RTBE1, a switching link of matrix ME1, and downstream transceiver RTBU1 of network stage iT feeding the incoming bytes to upstream transceiver RTBU1 of network stage 1T feeding the incoming bytes to upstream transceiver RTBE2 of unit UC1b (FIG. 4). The controller CTR1b of the latter unit is made aware of this selection by a modified routing instruction sent via bus bd1, coupling circuits TNBD1 and ITNBD1 as well as upstream transceiver RTBE5 of network stage 5T to the downstream transceiver RTBU4 of stage 4T which forwards it by way of circuits ITNBD2, TNBD2 and bus bd2 to controller CTR1b. In an analogous manner, this controller now establishes a forward path, leading to stage 3T, through matrix MCE1 by way of its upstream and downstream transceivers RTBE2 and RTBU2. The controller's decision, selecting for example the matrix MCC1 (FIG. 5) for an extension of that signal path, is communicated to the third-stage controller CTR1c by a routing instruction reaching same via bus bd2, circuits TNBD2, ITNBD2, transceivers RTBE4, RTBU3', circuits ITNBD3', TNBD3' and bus bd3. Controllers CTR1a and CTR1b may already have set up the two last segments of the forward path, as where the original routing instruction specified an output group (e.g. B8) served by the same modular unit as the input group (e.g. A1) to be placed in communication therewith; in such a case, controller CTR1c will have to make only a limited choice concerning the temporal interlinking of the two channels. Otherwise, this controller may have to select also one of the fourth-stage matrices in its switching plane for an extension of the signal path. Its circuits TNDB3, ITNBD3 and upstream transceiver RTBE3 to downstream transceiver RTBU2 of the second-stage matrix integrated with the selected fourth-stage matrix for transmission to the controller CTRb thereof in the manner already described. The extension to a fifth-stage matrix and the information of the associated controller via the downstream transceiver RTBU1 of its first-stage mate proceeds in analogous fashion.

Circuits TNBD1 and TNBD5 are interfaces enabling the asynchronously operating controllers to dialogue through a synchronous transmission path such as a PCM link. Their structure is described in commonly owned U.S. Pat. No. 4,345,325 in the names of Marco Gandini and Ernesto Viale.

In the present instance, circuits TNBD1, TNBD5 and their counterparts provided in switching units UCb and UCc of planes PC1 . . . PCn are capable of transmitting and receiving up to a maximum of a 16 8-bit words or bytes. These 16 bytes are part of 16 messages consisting of 7 bytes each; the first byte is a function code which indicates the presence of a message and its character (e.g. a routing instruction), the five subsequent bytes represent the information content and the last byte is a check word (e.g. one representing the binary sum of the six preceding bytes). Transmission of reception of a complete message will thus occupy 7 frames. Circuits TNBD1 and TNBD5 are connected to controller CTR1$a$ through the data bus, and to circuits ITNBD1 and ITNBD5 through connections $m_1$, $n_1$ and $m_5$, $n_5$ designed to convey a 32-channel PCM group.

Circuits ITNBD1 and ITNBD5 carry out serial/parallel and parallel/serial conversion as well as the following tasks:
(a) respectively receiving from downstream transceivers RTBU5 and RTBU1 the instruction words of the virtual dialogue channels associated with channel groups B1 . . . B8, C1 . . . C16 and inserting them in as many PCM channels (specifically even-numbered ones) of the serial flow on lines $m_1$, $m_5$; and
(b) respectively transferring outgoing instruction words from controller CTR1$a$, present during even-numbered time slots on leads $n_1$ and $n_5$, to upstream transceivers RTBE5 and RTBE1 for insertion into the virtual channels associated with groups F1' . . . F16' and A1 . . . A8.

The order number of the channel from which contents are to be extracted and in which information will be inserted is determined by the phase relationship between the 8-kHz sync pulse of an arriving PCM frame and the frame timing of the PCM network of which the circuit forms part. The structure of circuits ITNBD will be described below with reference to FIG. 6.

Figure 5:
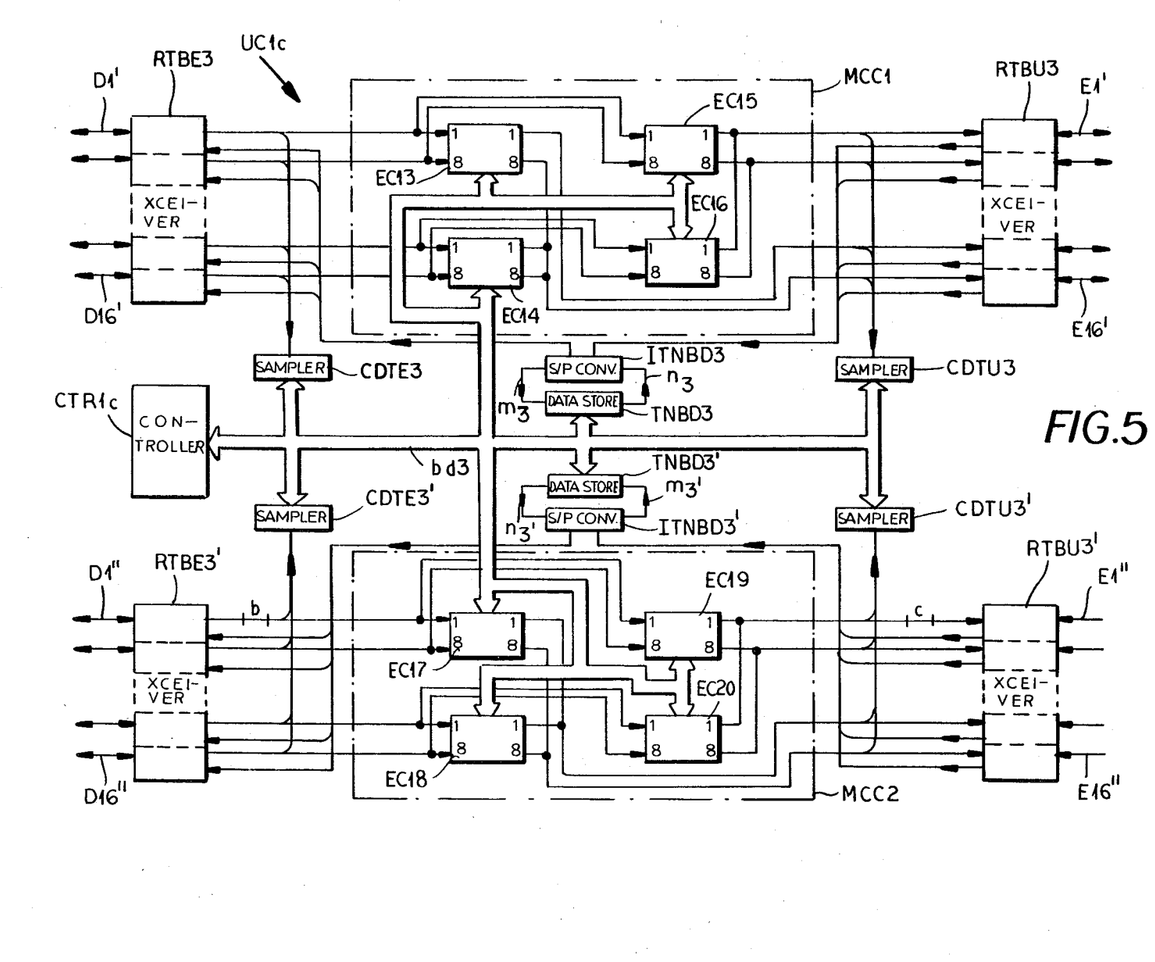

FIGS. 4 and 5 show the structure of modular units UC1$b$, UC1$c$, which is perfectly analogous to that of unit UC1$a$ except for a difference in the number of switching elements EC that constitute their matrices. Thus, each of these matrices contains four (instead of two) switching elements, with inputs and/or outputs connected in parallel, so that the matrices switch 16 PCM groups as described in the aforementioned U.S. Pat. No. 4,386,425. These elements are designated EC5–EC12 in FIG. 4 and EC13–EC20 in FIG. 5. Moreover, we have indicated the input/output groups of matrix MCE1 by C1' . . . C16', D1 . . . D16 (FIG. 4), those of matrix MCU1 by E1 . . . E16, F1 . . . F16, those of matrix MCC1 by D1' . . . D16', E1' . . . E16' (FIG. 5), and those of matrix MCC2 by D1" . . . D16", E1" . . . E16". Here, also, circuits RTBE, RTBU, CDTE, CDTU, TNBD, ITNBD and leads m, n, included in different switching units, are given suffixes identifying the stage to which they belong. Suffixes 3 and 3' have been used for the third stage.

The numerical capacity regarding PCM channels handled by individual switching units has been so chosen as to make it possible for current technology to realize each switching unit as a single replaceable structural element (printed-circuit board). This numerical value has been determined on the basis of the characteristics of the switching matrices adopted (ME, MCE, MCC, MCU, MU), of the coupling circuits (ITNBD, TNBD) facilitating dialogue among the controllers CTR, of the ancillary circuits for diagnostic purposes (CDT, RTB) and of the commercially available microprocessors (CTR) and associated peripheral circuits; printed-circuit boards should also conform to established norms, e.g. the DIN standard "Double Europe" format.

It should be noted that the organization of switching matrices ME1, MU1, MCE1, MCU1, MCC1 and MCC2 given by way of example in FIGS. 3, 4 and 5 makes it possible to use components of even greater capacity (double, for example), should such matrices become available on the market, with the structure of the entire network of FIG. 1 remaining unchanged.

The three kinds of switching units illustrated in FIGS. 2–4 correspond to three physically different modes of utilization of the same type of printed-circuit board.

Our extensive use of network structures incorporating replaceable modular elements of the same type with only a limited number of components of different types, as disclosed here, affords considerable advantages in terms of production, stocks and maintenance.

The paired circuits ITNBD and TNBD considerably reduce the load on the associated microprocessor controller by taking over the repetitive portion of the dialogue consisting in the storage and formation of the entire message. The use of standard components for serial dialogue would oblige the controllers to follow part of the dialogue, thus diminishing their ability to perform other functions.

Figure 7:
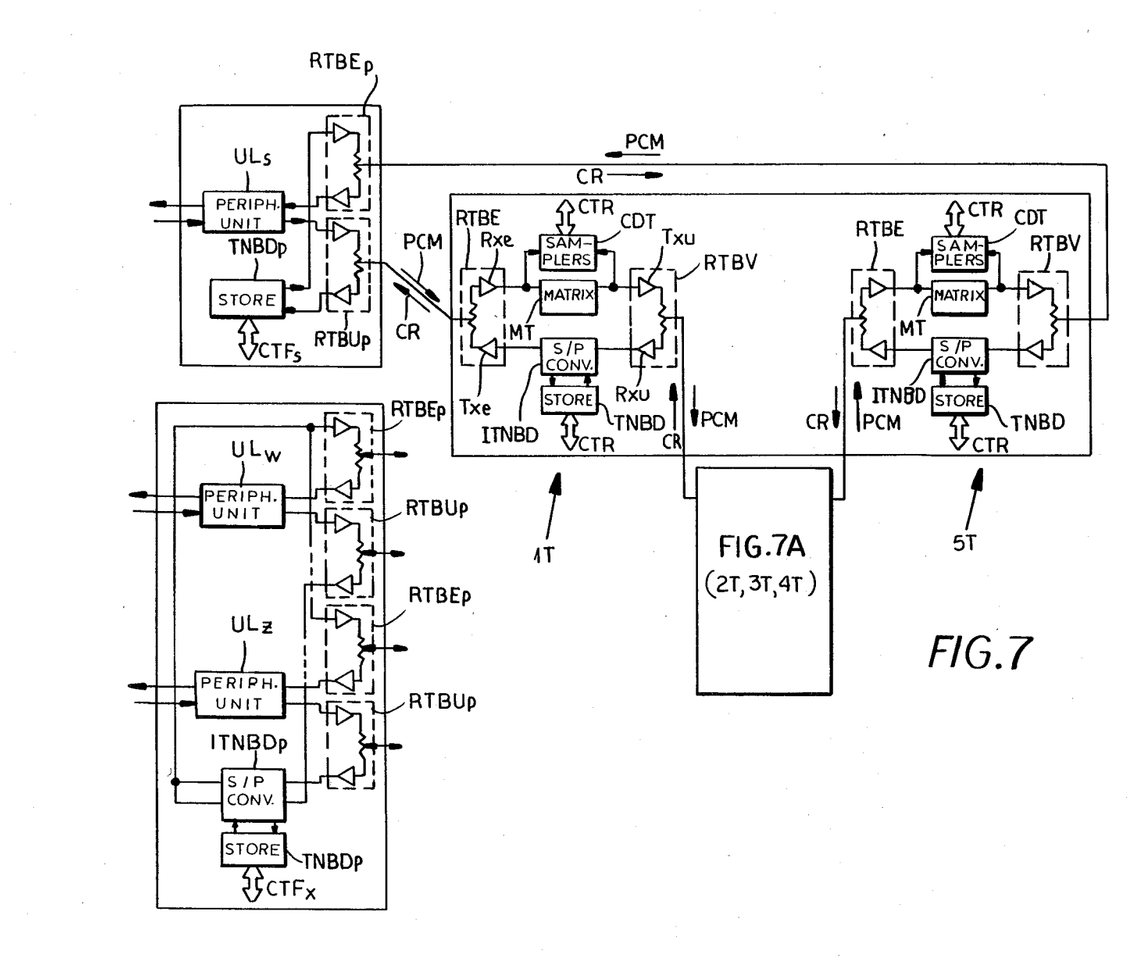
FIG. 7 schematically illustrates the passage of speech signals and routing instructions through the network.
Figure 7A:
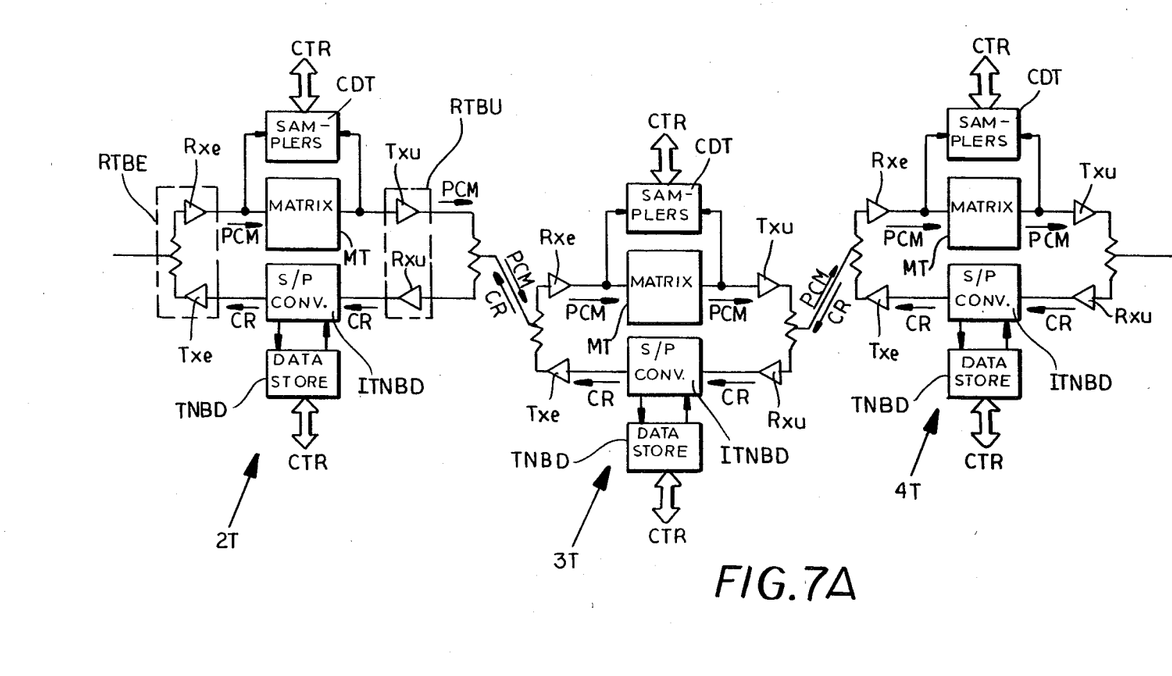
FIG. 7A shows details of a block seen in FIG. 7.

FIGS. 7 and 7A show, in simplified diagrammatic form, the several segments of a forward-signaling path for message words or speech bytes PCM along with the conjugate path segments traversed in the opposite direction by routing-instruction words CR. Transmitting and receiving sections of transceivers RTBE and RTBU have been respectively indicated by Txe, Txu and Rxe, Rxu. The switching matrix utilized in each network stage 1T–5T has been designated MT while the associated pair of samplers is represented by a member CDT connected thereacross. Also shown are interfaces or storage circuits TNBD and associated converters ITNBD for each network stage.

Figure 6:
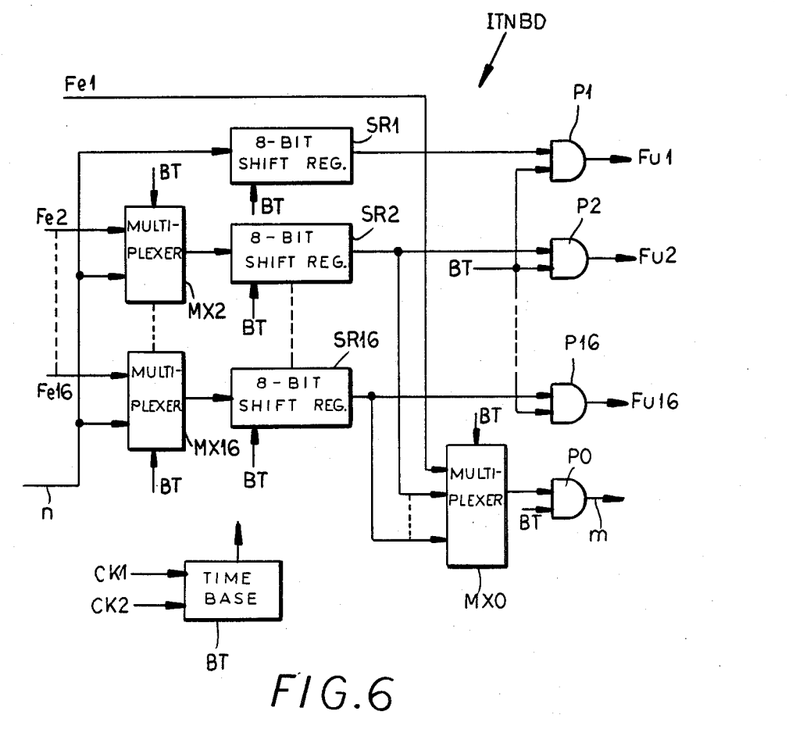
FIG. 6 is a block diagram of circuitry used for dialogue between controllers of the network.

Peripheral units forming part of the external exchange equipment, similar to those shown at UL-1–UL2048 in FIG. 2, have been indicated at UL$_s$, UL$_w$ and UL$_z$; a single external storage circuit or interface TNBDp, associated with unit UL$_s$, dialogues with a controller CTF$_s$ whereas another such storage circuit, associated with units UL$_w$, UL$_z$ and possibly with some intervening units, dialogues with a controller CTF$_x$ but is separated from these units by a converter ITNBDp of the type described with reference to FIG. 6. Peripheral transceivers RTBEp and RTBUp communicate with the external components referred to.

Thanks to the use of these and the other ancillary circuits, the control network can satisfactorily handle a large flow of routing orders, making it possible to use the network also for auxiliary functions such as dialogue between the control units arrayed on its periphery.

In this way, the external control units can be interconnected at any time on the basis of a specific routing instruction sent to the network, thus avoiding the need for permanent connections within the network which would limit its capacity.

FIG. 6 shows a preferred embodiment of a converter circuit ITNBD, with 16 incoming and outgoing PCM groups; the No. 0 channel of each PCM group is the one dedicated to intercontroller dialogue. Modifications required for application to a number of groups other than 16, as could be necessary for use in controller CTFb (FIG. 2), will be readily apparent. Incoming and outgoing speech groups are carried by lines Fe1 . . . Fe16, Fu1 . . . Fu16 whereas connections m, n (leading to and from the associated data stores) are representative of leads $m_1$ . . . $m_5$, $n_1$ . . . $n_5$ of FIGS. 3–5. The circuit of 16 8-bit shift registers SR1, SR2 . . . SR16; the inputs of registers SR2 . . . SR16 are connectable to incoming lines Fe2 . . . Fe16 through 2-input multiplexers MX2 . . . MX16 each having a second input connected to lead n; the outputs of the same registers are connected to outgoing lines Fu1 . . . Fu16 through AND gates P1 . . . P16 and in parallel therewith to as many inputs of a multiplexer MX0, which has a sixteenth input connected to line Fe1 and an output connected through an AND gate P0 to lead m.

Register SR1 has an input connected to lead m and an output connected through AND gate P1 to line Fu1.

A time base BT derives control signals for the switching of multiplexers MX0, MX2 . . . MX16 and for the stepping of shift registers SR1 . . . SR16, as well as enabling signals for the same registers and for gates P0 . . . P16, from a bit-synchronism signal CK1 at 2048 MHz and a frame-synchronism signal CK2 at 8 kHz. In particular, in the time slot allotted to channel No. 0 multiplexer MX0 connects output lead m to its input tied to line Fe1, multiplexers MX2 . . . MX16 connect the inputs of their associated registers to lines Fe2 . . . Fe16, the registers are all enabled for shifting, and gates P0 . . . P16 are unblocked.

Throughout the remainder of the frame, multiplexers MX2 . . . MX16 connect registers SR2 . . . SR16 to lead n and gates P1 . . . P16 are blocked. Furthermore, in even-numbered time slots (Nos. 2, 4 . . . 30) registers SR2 . . . SR16 are consecutively enabled, multiplexer MX0 successively connects the outputs of these registers to its own output and gate P0 is again unblocked to transfer their contents to lead m.

At time slot No. 0 of each frame, accordingly, the bits of the No. 0 channel of the group arriving on line Fe1 pass to lead m, the bits of the No. 0 channels of the groups arriving on leads Fe2 . . . Fe16 are loaded into the registers SR2 . . . SR16, and the bits of the No. 0 channel of the PCM flow on lead n are loaded into register SR1. Simultaneously, the previous contents of registers SR1 . . . SR16, loaded respectively in the even-numbered time slots Nos. 0, 2, 4 . . . 30 of the preceding frame, are emitted on lines Fu1 . . . Fu16.

In time slots Nos. 2, 4 . . . 30 of the new frame, registers SR2 . . . SR16 respectively receive the contents of the channels of the PCM flow on lead n, and the byte loaded in the No. 0 time slot of the same frame is emitted on lead m through multiplexer MX0. Thus, the bytes of the No. 0 channels arriving in parallel over lines Fe1 . . . Fe16 are fed in series on lead m to the associated data store TNBD (FIGS. 3–5) and, after being serially read out therefrom on lead n, are sent out in parallel over lines Fu1–Fu16.

Lines Fe1–Fe16 and Fu1–Fu 16 respectively originate at the downstream and upstream transceivers RTBU, RTBE of the associated matrix as will be apparent from FIGS. 3–5.

We shall now describe the operation of the control network RC for diagnosis and routing.

A routing instruction emitted by the control equipment of the exchange will contain in its function code the information that a connection is to be made; the five subsequent words identify incoming and outgoing channels of the network as well as the outgoing group. Since the dialogue is of the associative type, the identity of the incoming group is always unequivocally determined by the identity of the dedicated channel, even if transmission occurs in the opposite direction.

It will be supposed by way of example that the incoming channel is channel x of group A1 (FIG. 3) and that the outgoing channel is channel y of group B8. The message will thus be emitted by controller CTFa (FIG. 2) on the dedicated No. 0 channel of group A1.

Through transceivers RTBUp and RTBE1 (FIG. 3), the first word of this message reaches converter ITNBD1 which inserts it in an available channel of the PCM flow transmitted on lead $m_1$ to circuit TNBD1. The latter recognizes that the message has arrived, through the procedures described in the aforementioned U.S. Pat. No. 4,345,325, and stores the byte present on the channel. The same operation is repeated for the six subsequent frames. After receiving the seven bytes, circuit TNBD1 generates an INTERRUPT signal which is used by the local controller CTR1a to transfer the message from the memory of circuit TNBD1 to its own data store through bus bd1.

Internal controller CTR1a checks whether the message is correct by using the last byte thereof. The same checks on the correctness of the message are carried out in the following stages. At this point we shall only consider the case in which all those checks have a positive outcome; the consequences of an opposite result will be discussed hereinafter.

Since the message is correct, circuit CTR1a locates a signal path between the first and second network stages 1T, 2T on the basis of the free or busy state of the interstage links; known algorithms may be used to minimize transit delay. Once a free signal path has been found, the controller forwards the routing instruction to matrix ME1 through bus bd1; proper execution is verified with the aid of samplers CDTE1 and CDTU1.

Let us assume that the instruction concerns the elemental array EC1 and causes a switching of channel x of group A1 (input No. 1 of that array) to channel a of group C16 (output No. 8 of array EC1) connected to input No. 1 of matrix MCE1 which is part of switching unit UC1b (FIG. 1) of plane PCk, with k=16. A routing through unit EC1 having been selected, the parallel-connected input No. 1 of array EC2 paired therewith is disabled.

When the switching has been carried out, and possibly after a checking of the continuity—by diagnostic procedures described hereinafter—of the physical path chosen toward the second stage 2T, controller CTR1a modifies the received routing instruction by replacing the identity of the input channel with that of the output channel of the first stage 1T. The rest of the information content of the routing message (network output channel and group) remains unchanged.

The modified instruction is sent to circuit TNBD1 through data bus bd1; circuit TNBD1 stores this instruction, inserts it in an available channel of the PCM flow transmitted on lead $n_1$, and forwards it to converter ITNBD1 which in turn transfers it to the virtual channel of group F16' conjugate with group C16.

Through components RTBE5, RTBU4, ITNBD2, TNBD2 and bd2 (FIG. 4) the new message reaches controller CTR1b (FIG. 4) which, from the identity of the dialogue channel, recognizes a routing instruction concerning the second stage 2T and, in particular, channel a of group C1'. Circuit CTR1b locates a free channel among the 512 outputs of matrix MCE1, using the same procedure as controller CTR1a.

We shall assume by way of example that the choice concerns channel b of group D16, which is connected to input No. 1 of matrix MCC16 of unit UC8c (FIG. 1); this incoming group corresponds to group D1" of FIG. 5. Controller CTR1b (FIG. 4) selects in matrix MCE1 the elemental array which is to carry out the connection, in this case element EC5; the connection involves the No. 8 input and output of that array so that the controller must disable channel b of output No. 8 of array EC6 whose outputs are connected in parallel with those of array EC5. After a verification that switching has been carried out, the pertinent data are stored in controller CTR1b which forwards the new message to circuit CTR8c (FIG. 1) through bus bd2, circuits TNBD2, ITNBD2, RTBU2 and devices corresponding to components RTBE3', ITNBD3', TNBD3' and bd3 (FIG. 5).

With the network organization described, routing (as far as the PCM group is concerned) is unequivocal from this point on: to reach output group B8 (FIG. 1), it is necessary to access matrix MU1 which can be reached from matrix MCC16 only through the No. 1 output of the same matrix (corresponding to group E1", FIG. 5, and connected to input No. E16 of matrix MCU1) and the No. 1 output of matrix MCU1 (group F1, FIG. 4). Consequently, once the input channel to which the message refers is recognized, controller CTR8c can only select a channel within the first group (channel c, for example), establish the connection, and prepare the new message for controller CTR1b (FIG. 1). The latter recognizes a routing instruction for the fourth stage 4T and selects a channel (channel d, for example) in an output group F1, which corresponds to group F16' (FIG. 3) at the input of matrix MU1. After completing the connection between channel c of group E16 and channel d of group F1 through array EC12, controller CTR1b forwards the new message to circuit CTR1a which in turn lets matrix MU1 connect channel d of incoming group F16' to channel y of outgoing group B8. This connection involves the No. 8 input and output of array EC4.

At this point the desired connection within network RC is set up; a confirmatory message may be routed by controller CTR1a to the external control unit to which the line carrying group B8 is connected, use being made for this purpose of the virtual channel of group A8 conjugate with group B8.

Disconnections are carried out in accordance with the same procedure as have been described for connection. The relevant message is emitted by the external control unit (e.g. controller CTFa, FIG. 2 which has emitted the routing instruction and contains in its data field an identification of the incoming channel relating to the path to be released (here channel x of group A1). The message is received by controller CTR1a of unit UC1a (FIG. 3), which looks in its data store for the output channel and group associated with the input channel and group identified by that message. In this case the output channel is channel a and the group is No. 16. Controller CTR1a carries out disconnection in matrix ME1, verifies this disconnection with the aid of extractor CDTU1, modifies the data field of the message by replacing the indentification of channel x with that of channel a, and transmits the disconnection message toward second-stage controller CTR1b on the dedicated dialogue channel of output group No. 16. The procedure is then repeated in an analogous manner up to the fifth-stage controller CTR1a, which can inform the peripheral unit connected thereto that the signal path has been released.

Two distinct diagnostic procedures are available for verification purposes.

The first procedure involves a check of the connections set up within each switching unit. This is carried out by controllers at each stage through samplers CDTE and CDTU. In particular, a byte of the input channel concerned is extracted through circuit CDTE and compared with the same byte extracted by circuit CDTU from the corresponding output channel of the matrix, making allowance for delay (in terms of number of frames) due to transit through the matrix between the locations at which the bytes are extracted. Several test modalities are possible. Thus, for example, a connection may be tested immediately after being set up, some or all of the segments of an established signal path can be cyclically checked, or the two kinds of test may be carried out jointly with pre-assigned priority criteria. We generally prefer to give top priority to the most recently completed path segment.

The second procedure concerns a check of circuits ITNBD, RTBU, RTBE and of the physical links between network stages and between the network and its periphery. This procedure is carried out by circuit TNBD exploiting a control word in each message and the fact that, with a mode of operation as described in the aforementioned U.S. Pat. No. 4,345,325, the message is generally followed by a "rest" word of predetermined bit configuration indicating the vacant state of a memory cell. Thus, circuit TNBD will be able to check whether a mismatch between two extracted bytes is due to a transmission error or possibly to the interruption of an interstage link. Circuit TNBD, when activated by the associated controller, may therefore look for the presence of a "rest" word and, in its absence, will inform the controller that a discontinuity exists in the link allocated to routing instructions. The integrity of such a link will, of course, also be significant for speech bytes transmitted thereover in the forward direction.

The described procedures, accordingly, enable a complete coverage of the entire network circuitry.

The detection of any failure of active constituents of a controller (microprocessor, memories) involves conventional self-diagnostic methods such as parity checks and software traps.

The diagnostic modalities referred to are compatible with conventional procedures for overall network supervision, carried out by associated peripheral units.

In attempting to set up a connection, the controller of a stage may be unable to forward the routing message to the next stage because it cannot find a free channel leading thereto; such a situation is termed "blocking". With reference to the example described above, let us suppose that the blocking involves the third stage, i.e. that controller CTR8c (FIG. 1) cannot locate a free channel able to link the fourth stage 4T with channel b of group D1". Controller CTR8c then modifies the routing message for channel b (while leaving its data field unchanged), by inserting a function code relating to route blocking, and transmits the message so modified to the originating controller CTR1b through a dialogue channel available on the link between the third and fourth stages.

After receiving the blocking message relating to channel b of output No. 16 of matrix MCE1, controller CTR1b locates in its memory the routing data relating to the designated output channel. After retrieving routing information (from channel a of group C1' on input No. 1 of matrix MC1 to channel b of group D16 on output No. 16 of matrix MCE1), it disconnects the output channel of matrix MCE1 and reroutes channel a toward a third-stage matrix via a path excluding the link used in the first attempt.

The maximum number of rerouting attempts within a switching plane PC may be preprogrammed. Once this number is exhausted the blocking message is sent back to the first-stage controller (in this case circuit CTR1a) which had sent out the routing instruction; controller CTR1a will then proceed to reroute the connection through a switching plane other than PC16.

The preceding description clearly shows the advantages which our invention affords over prior-art systems in terms of modularity, flexibility of utilization, distribution of functions and quality of performance.

In particular, the present invention makes it possible to provide network structures which have capacities ranging from a few hundred to several hundred thousand PCM channels with a number of temporal stages ranging from one (network consisting of a single 8×8 or 16×16 matrix) to seven, using a single type of basic module. A three-stage network, for example, may consist of a single switching plane with a capacity of 8,192 channels. With a given number of stages, the capacity may be varied by changing the number of matrices and their connections. Halvig the number of matrices in a switching plane and connecting the two sets of output lines of a matrix MCE to the two sets of input lines of a matrix MCC yields switching planes of 4,096 channels; a five-stage network with 32 central planes can be obtained by using matrices ME with 16 inputs lines and 32 output lines, and matrices MU with input lines and 16 output lines. In any case, high efficiency is always maintained in the ratio between hardware employed and the number of channels served.

A seven-stage network is also possible, through problems of transit delays and routing times may make its use less desirable. In this case, the folded switching units would respectively combine matrices of the first and seventh stages, of the second and sixth stages and of the third and fifth stages; the fourth-stage switching unit would remain unfolded.

Furthermore, the network can adapt itself easily to technological developments in its integrated constituents and provides a considerable distribution of control so as to optimize the ratio between installed processing power with a given equipment configuration and the number of channels served.

The presence of a local controller on each individual switching unit makes the network truly self-routing in that the connection of a PCM channel within the network is selected indpendently by the controller of the switching unit involved in each stage. In this way, the peripheral exchange controllers are completely relieved of the task of locating a signal path through the network. The use of special integrated circuits for dialogue among switching-unit controllers relieves the microprocessor of dialogue handling and affords shortened actuaiton times whereby a large number of connection requests can be expeditiously accommodated.

The constructive folding of the network according to our invention, which facilitates the transmission of routing instructions in a reverse direction through virtual channels, enables a complete separation of the physical paths of these instructions from speech or other message words traveling in the forward direction.

Although our preferred embodiment described above uses a virtual channel for each group of message channels, the number of such virtual channels could be reduced (to a single such channel in a limiting case).

The blocking characteristics of the network are such as to ensure negligible losses in any operating condition for the maximum envisaged traffic levels; thanks to the use of controllers distributed among the switching units, the network can automatically find alternative routing paths in the event of blocking or internal failure without depending on the intervention of peripheral control units.

Transit delay on the PCM channels established by the network is minimized by strategies individually implemented by each switching-unit controller; the use of specialized ancillary circuits for diagnosis makes it possible to extend the functions of veritication, failure localization and reconfiguration to the level of the individual structural units and thus cover failures involving the links between the basic modules making up the network.

A switching unit of the type herein disclosed, equipped with a controller and ancillary diagnostic circuitry, is capable of performing autodiagnosis and configuration-identification procedures, thus relieving the supervisory organis in the exchange of the heavy burdens imposed by these tasks.

With the utilization of microprocessors for the local controllers, the use of different operating programs for the controllers of each unit and suitable selection of the number and structure of central switching planes PC, we can choose the optimum comprise regarding actuation times, blocking probability, diagnosis and network cost, and thus cover the entire range of possible telephone-switching applications (transit, urban, local or mixed exchanges). For example, network structures with a limited number k of internal planes enable a reduction in the number of switching units employed and hence of cost; however, a larger number of possible routing attempts must then be allowed in light of the higher blocking probability. This strategy will obviously give rise to longer actuation times in the switching network. On the other hand, with a larger number of planes we can reduce the number of routing attempts since the blocking probability is intrinsically low in that case; short actuation times are thus possible.

Moreover, with a given equipment configuration, it is possible to modify the controller programs to provide a network with a sophisticated diagnostic facility at the expense of actuation speed or, conversely, a network with less elaborate diagnostic capabilities but designed to execute commands from the peripheral organs more quickly, as could be required if the exchange must handle new services (e.g. data transmission).

Reference is further made to another commonly owned application, Ser. No. 506,710 filed on even date herewith by two of us (Piero Belforte and Luciano Pilati) jointly with Mario Bondonno and Bruno Bostica, showing a generally similar switching network.

We claim:

1. In an automatic exchange of a telecommunication system for the selective transfer of exclusively PCM messages from a multiplicity of input lines to a like multiplicity of output lines, in combination:
    a switching network divided into an odd number exclusively of timedivision stages each including a plurality of switching matrices individually connectable in cascade with matrices of an adjoining stage to set up forward-signaling paths for the transmission exclusively of PCM message words from given input lines to selected output lines, matrices of nonadjoining stages on opposite sides of a middle stage being structurally united into matrix pairs;
    external control means for commanding the establishment and disestablishment of exclusively temporal connections between incoming and outgoing PCM channels by way of forward-signaling paths set up by said matrices; and
    internal control means responsive to commands from said external control means for selectively establishing and selectively disestablishing said connections, said internal control means including common controllers for respective matrix pairs of said nonadjoining stages and central controllers for matrices of said middle stage, said internal control means further including ancillary circuitry bypassing the cascaded matrices for the transmission of routing instructions between said external control means, said common controllers and said central controllers in a direction opposite that of message-word transmission via interstage links forming part of said forward signaling paths.

2. The combination defined in claim 1 wherein each of said interstage links include transceivers disposed upstream and downstream of each matrix.

3. The combination defined in claim 2 wherein said ancillary circuitry includes, for any forward-signaling path set up by a common controller of a matrix pair through one matrix of said pair, the transceivers disposed downstream and upstream of the other matrix of said pair.

4. The combination defined in claim 3 wherein each PCM channel is part of a channel group having respective time slots assigned thereto in a recurrent frame marked by accompanying synchronization pulses, a predetermined time slot of said frame being assigned to a virtual channel for the transmission of routing instructions in said opposite direction from the downstream transceiver of said other matrix to said common controller and from the latter to the upstream transceiver of said other matrix.

5. The combination defined in claim 4 wherein said ancillary circuitry further includes storage means inserted between said common controller and the transceivers of said other matrix.

6. The combination defined in claim 5, further comprising timing means responsive to said synchronization pulses for serializing instruction words passing from said downstream transceiver to said storage means in said predetermined time slot and pertaining to a plurality of channel groups passing simultaneously through said one matrix, said storage means being controlled by said timing means to emit outgoing instruction words during said predetermined time slot to said upstream transceiver.

7. The combination defined in claim 6 wherein said ancillary circuitry further comprises a converter inserted between said storage means and said downstream and upstream transceivers, said converter being controlled by said timing means for serializing incoming instruction words emitted by the downstream transceiver during said predetermined time slot and parallelizing stored instruction words sent during said predetermined time slot to the upstream transceiver.

8. The combination defined in claim 7 wherein said converter comprises a multiplicity of shift registers jointly loadable in said predetermined time slot with incoming instruction words from the downstream transceiver and consecutively loadable in further time slots of a frame with stored instruction words to be sent to the upstream transceiver, first multiplexer means responsive to signals from said timing means for controlling the loading of said shift registers, and second multiplexer means responsive to signals from said timing means for controlling the unloading of said shift registers with sequential readout of the incoming instruction words to said storage means and with concurrent readout of the stored instruction words to the upstream transceiver.

9. The combination defined in claim 8 wherein said predetermined time slot is the first slot of a frame, said second multiplexer means directly conveying to said storage means an instruction word appearing on one output of said downstream transceiver during said first time slot.

10. The combination defined in claim 9 wherein the number of said shift registers is one less than half the number of time slots per frame, said first and second multiplexer means being controlled by said timing means to establish communication between said storage means and respective shift registers during every other time slot following said first time slot.

11. The combination defined in claim 2, further comprising a pair of samplers connected across each matrix for extracting message words entering and leaving the respective matrix in an established path segment at instants separated by the transit time of said segment, said samplers being connected to the controller associated with the respective matrix for enabling a comparison of the extracted message words by said associated controller to verify the continuity of said path segment.

12. The combination defined in claim 11 wherein said ancillary circuitry further includes interface means activable by the associated controller, in response to a mismatch between the extracted bytes, for checking on the presence of a continuity-indicating test code emitted by the downstream transceiver of a matrix paired with said respective matrix.

* * * * *